United States Patent
Davies et al.

(10) Patent No.: US 6,594,493 B1
(45) Date of Patent: Jul. 15, 2003

(54) PAGING ARRANGEMENT FOR WIRELESS COMMUNICATIONS

(75) Inventors: Stephen William Davies, Toronto (CA); Michaela C Vanderveen, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/500,550

(22) Filed: Feb. 9, 2000

(51) Int. Cl.[7] ................................................. H04Q 7/20
(52) U.S. Cl. ........................ 455/436; 455/458; 455/567
(58) Field of Search ................................. 455/436, 458, 455/459, 460, 567

(56) References Cited

U.S. PATENT DOCUMENTS

| | | | | |
|---|---|---|---|---|
| 5,369,681 A | * | 11/1994 | Boudreau et al. | 340/7.25 |
| 5,548,816 A | | 8/1996 | Devaney | 455/53.1 |
| 5,649,289 A | * | 7/1997 | Wang et al. | 340/7.22 |
| 5,734,984 A | * | 3/1998 | Reece et al. | 455/436 |
| 5,777,560 A | * | 7/1998 | Sakai et al. | 340/7.27 |
| 5,839,070 A | * | 11/1998 | Lupien et al. | 455/440 |
| 5,889,768 A | * | 3/1999 | Storm et al. | 370/209 |
| 5,953,667 A | * | 9/1999 | Kauppi | 455/417 |
| 5,960,345 A | | 9/1999 | Laatu | 455/435 |
| 6,058,308 A | * | 5/2000 | Kallin et al. | 455/432 |
| 6,181,933 B1 | * | 1/2001 | Jeong | 455/432 |
| 6,304,755 B1 | * | 10/2001 | Tiedemann et al. | 370/332 |
| 6,351,641 B2 | * | 2/2002 | Verkama | 455/426 |
| 6,415,153 B1 | * | 7/2002 | Liew | 455/115 |
| 6,438,117 B1 | * | 8/2002 | Grilli et al. | 370/331 |

FOREIGN PATENT DOCUMENTS

| WO | WO 97 50274 A | 12/1997 | H04Q/7/38 |
|---|---|---|---|

OTHER PUBLICATIONS

European Search Report No. EP 01 30 0743, dated May 25, 2001—European Patent Office—The Hague.

Hu, et al., "Adaptive Location Management Scheme For Global Personal Communications", IEE Proceedings, Communications, Institution of Electrical Engineers, G.B., vol. 144, No. 1, Feb. 1, 1997, pp. 54–60.

* cited by examiner

Primary Examiner—William Trost
Assistant Examiner—Marcos Torres
(74) Attorney, Agent, or Firm—Eugene J. Rosenthal

(57) ABSTRACT

Paging areas aligned with wireless terminals are dynamically created. A first base station passes to the wireless terminal a list of all the base stations that it knows and are within a prescribed number of handoffs of the first base station. The wireless terminal uses this list to define its own "personal" paging area. Each time the wireless terminal emerges from a sleep state, it listens for the base station having the best signal and compares its identification against the list of base stations in its personal paging area. If the best signal base station is on the list, any paging messages for the wireless terminal are automatically broadcast by that base station. Otherwise, the wireless terminal must conduct a handoff to that base station to obtain a new personal paging area centered on that base station with that base station as paging agent. Messages originating elsewhere in the network are forwarded to the paging agent for delivery to the wireless terminal. The paging agent then instructs all known base stations within prescribed number of handoffs of it to page the wireless terminal. The wireless terminal, on hearing the page, will form a connection with the base station having the best signal for communicating. The base station having the best signal for communicating notifies the paging agent that it has established a connection with the wireless terminal, which leaves paging mode and becomes active.

10 Claims, 2 Drawing Sheets

PAGING ARRANGEMENT FOR WIRELESS COMMUNICATIONS

TECHNICAL FIELD

This invention relates to the art of wireless communication, and more particularly, to a system for efficient paging of wireless terminals.

BACKGROUND OF THE INVENTION

Prior art wireless systems employ a technique known as sleeping, which is coupled with a technique known as paging, to conserve resources, e.g., power and/or bandwidth, when the wireless terminal is not expected to be in its active communicating state, e.g., on call, for some time. Often the time that a wireless terminal is determined to not be expected to be in its active communicating state is a function of its prior activity, e.g., when the wireless terminal has not been communicating actively for a prescribed time period. When the wireless terminal is not expected to be in its active communicating state it goes into "sleep" mode, a mode in which both the receiver and transmitter of the wireless terminal consume significantly less power. For example, in some systems, both receiver and transmitter are turned off during this sleep time.

A wireless terminal prior to going to sleep is assigned a specific paging channel land time. The paging channel is at least a logical channel, although it may be a physical channel, that is used to communicate pages, i.e., paging messages. At the assigned time, the wireless terminal "wakes up", tunes its receiver to the assigned paging channel, and listens to see if there are any pages for it, which may simply be the transmission of an identifier for the wireless terminal. If there is a page, and the page does not contain the entirety of the message to be communicated to the wireless terminal, then the wireless terminal may tune to a channel, which may be known in advance to the wireless terminal or may be specified as part of the page, and conduct the appropriate information exchange to receive the message.

Notwithstanding that they may be in sleep mode, wireless terminals may move. As a result, their location may become such that a better signal may be obtained from a base station other than the one with which they communicated prior to going to sleep. When changing base stations, a wireless terminal would be expected to conduct a "handoff" whereby the new base station is contacted and arrangements are made for it to serve the wireless terminal. However, such handoffs are power consuming and use system resources that could otherwise be used to carry data traffic. To avoid these penalties, prior art systems have defined "paging areas" in which a sleeping wireless terminal need not conduct a handoff. Instead, all of the base stations within the paging area will broadcast any pages for the wireless terminal. The wireless terminal then needs only to tune its receiver to the base station having the best signal for communicating that is in the paging area. A central controller keeps track of which paging area each wireless terminal is in.

The prior art base stations also broadcast the identity of the paging area to which they belong. When a wireless terminal leaves a paging area, it can detect that it has left by noting the difference in the paging area identity it is now receiving from that which it was previously receiving. It will then conduct a handoff to the base station having the best signal for communicating with and will arrange to join the new paging area. The central controller will then route future messages for the wireless terminal to its new paging area.

Disadvantageously, prior art wireless systems need to know a priori the map of the paging areas. Typically such information has a high cost because it is developed during the course of system engineering or planning before constructing the network. Also disadvantageously, because of the fixed paging area boundaries, base stations on the edge of a given paging area are heavily loaded by the handoffs of page mode wireless terminals, and thus their capacity for normal data traffic is reduced.

SUMMARY OF THE INVENTION

We have recognized that the cost of wireless systems can be reduced significantly, and their performance increased, through the use of dynamic, wireless-terminal-based paging area assignment. Although it is possible to use the technique of the instant invention when the network architecture is known, to further reduce costs, preferably use is made of a wireless terminal controlled handoff process by which at least portions of the "map", i.e., the pattern of neighboring base stations, for use as a paging area, is discovered and updated. One such self-discovering network arrangement is disclosed in our copending United States Patent Application Serial No. (case Davies-Vanderveen 1-5), which is incorporated by reference as if set forth entirely herein. In such an arrangement, it takes at least one handoff for each such base station neighbor to discover its entire local map. Once the map of the network architecture is known, paging areas aligned with the wireless terminal's initial base station may be dynamically created, in accordance with an aspect of the invention. Advantageously, because there are no fixed paging area boundaries, paging handoffs may be spread relatively uniformly across base stations, thus avoiding the base station loading problem associated with fixed paging area boundaries.

More specifically, as part of the handoff process, the wireless terminal tells the new base station to which it is handing off the call the identity of the previous base station from which control is being handed off. If the new base station does not have a valid record for the previous base station, it forms a trust relationship with the previous base station and creates a record for it, thus identifying it as an immediate neighbor. Additionally, both base stations exchange lists of other base stations known to them, preferably with the constraint that these other base stations must be within a prescribed number of handoffs less one of the base station supplying the list. For example, a distance of two handoffs means that in travelling from base station A to base station C, a wireless terminal would hand off from A to B and then from B to C, thus performing a total of two handoffs. Thus the base station receiving the list will know of all the base stations within the prescribed number of handoffs of the receiving base station of which the base station supplying the list is aware.

When a wireless terminal first starts its session after power up, it forms a connection with its first base station. This base station then passes to the wireless terminal a list of all the base stations that are known to the first base station and are within the prescribed number of handoffs of the first base station. The wireless terminal then uses this list to define its own "personal" paging area. Thus, the prescribed number corresponds, loosely speaking, to a paging area radius for the wireless terminal's personal paging area, measured in units of handoffs. Each time the wireless terminal emerges from a sleep state, the wireless terminal listens for the base station having the best signal for communicating and compares its identification against the list of base stations in its personal paging area. If the base station having the best signal for communicating is on the list, then the wireless terminal knows that any paging messages for it will be automatically broadcast by the base station having the best signal for communicating. If the base station is not on the list, then the wireless terminal must conduct a handoff to this base station, and so it obtains from this base station a new personal paging area centered on that base station. Note that such handoffs are spread randomly throughout the whole system as the initial locations that wireless terminals start their sessions are random, as are their motion within the wireless communication coverage area.

The base station most recently engaged in a handoff with the wireless terminal, or the one with which the session was started with if handoffs have not yet been performed, serves as a paging agent for the wireless terminal. Messages originating elsewhere in the network are forwarded to the paging agent for delivery to the wireless terminal. The paging agent then instructs all known base stations within prescribed number of handoffs of it to page the wireless terminal. The wireless terminal, on hearing the page, will form a connection with the base station having the best signal for communicating. The base station having the best signal for communicating notifies the paging agent that it has established a connection with the wireless terminal, which caves paging mode and becomes active.

DETAILED DESCRIPTION

Figure 1:
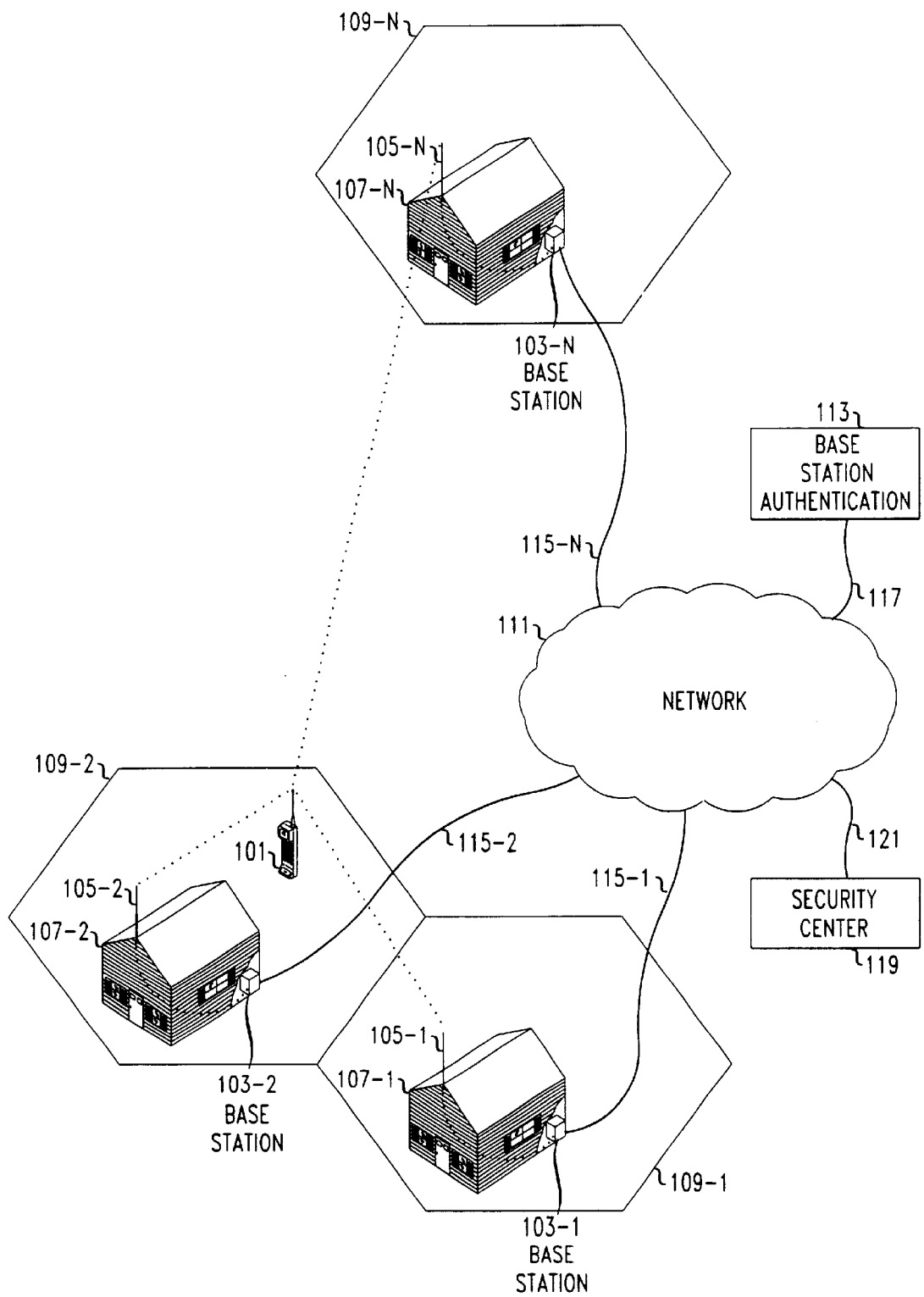
FIG. 1 shows an exemplary network arrangement in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any Mow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows an exemplary network arrangement in accordance with the principles of the invention. Shown in FIG. 1 are a) wireless terminal 101; b) N base stations 103, where N is an integer greater than or equal to 2, including base station 103-1 through 103-N; c) N antennas 105, including antennas 105-1 through 105-N; d) N structures 107, including structures 107-1 through 107-N; e) N cells 109, including cells 109-1 through 109-N; f) network 111; g) base station authentication unit 113; h) N communication links 115, including communication links 115-1 through 115-N; i) communication links 117 and 121; j) security center 119.

Wireless terminal 101 is able to communicate with multiple base stations which transmit with sufficient signal strength to be detected and useable for communication at the current location of wireless terminal 101. Once a signal of sufficient strength is detected for a particular base station, wireless terminal 101 may engage in communication with that base station. The particular types of wireless link and protocol, i.e., the air interface, employed by wireless terminal 0 1 are not essential to the invention and may be any type desired by the implementor, although of course the radio link and protocol employed by wireless terminal 101 must be the same type employed by base stations 103.

Wireless terminal 101 may achieve communication with multiple base stations in any manner desired by the implementer. For example, wireless terminal 101 may have only a single receiver, and it may receive signals, when not occupied with the exchange of information with the base station currently serving it, from other base stations that have signals of sufficient strength reaching wireless terminal 101. Alternatively, wireless terminal 101 may receive signals from multiple base stations simultaneously, e.g., by employing multiple parallel receivers in wireless terminal 101. Further alternatively, wireless terminal 101 may have more than one receiver, but the number of receivers is less than the number of base stations from which wireless terminal 101 can receive a signal of sufficient strength at its current location, so wireless terminal 101 needs to perform scanning on at least one of its receivers to obtain signals for some of the base stations.

Base stations 103 are substantially conventional base stations except for the following. First, base stations 103 need not be connected to a dedicated network for inter-base-station communication. Instead, base stations 103 can employ a shared public network, e.g., an internet protocol (IP)-based network such as the Internet. Second, each base station 103 need not contain any "map" information. Instead, each of base stations 103 is capable of discovering its necessary portions of the "map" information. Preferably, base stations 103 are small base stations that can easily be incorporated into a small space, e.g., one that is already available, rather than requiring dedicated construction and site preparation. Advantageously, such small size, coupled with the ability to discover the necessary portions of the "map" information, enable the rapid construction of a new wireless communication network. Furthermore, such a wireless communication network is flexible in its architecture, i.e., base stations can easily be added or removed, and it is also easy to maintain.

Each of antennas 105 are coupled to a respective one of base stations 103. Each of antennas 105 radiates the signal developed by its respective one of base stations 103. Each combination of a one of base stations 103 and its respective one of antennas 105 yields a one of cells 109, which is a particular coverage area. The shape of cells 109 in FIG. 1 do not represent actual cell shapes but instead are merely conventional notation for cells. Note that the shape of the actual various cells 109 are all independent.

Each of structures 107 provides a facility in which to place one or more of base stations 103. Furthermore, structures 107 may also provide a place on which to mount antennas 105. For example, some of structures 107 may be already existing homes in which a one of base stations 103 is located in an unused space and to which a one of antennas 105 is exteriorly affixed.

Network 111 provides a way for base stations 103 to communicate with each other, as well as with base station authentication unit 113 and security center 119. Network 111 may be made up of various subnetworks, which may be networks in their own right. Furthermore, the various subnetworks may be of different types and may employ different protocols. In one embodiment of the invention, network 111 is a packet based network, e.g., an asynchronous transfer mode (ATOM) network or an IP network.

Each of base stations 103 is connected to network 111 via a respective one of communication links 115, which may be construed as part of network 111. For example, where network 111, or at least a subnetwork thereof, is an IP network, and one of base stations 103 are located within structures 107 that are homes, communications link 115 may be an Internet connection, e.g., over cable television lines or a fiber-to-the curb connection, that is shared by the base station for communicating, with other base stations and by the occupants of the home for Internet browsing.

Base station authentication unit 113 contains a list of all valid base stations 103, and any associated information such as security keys and alternative identifiers or addresses of the base station. A base station may be listed in base station authentication unit 113 at any point. However, the base station only becomes valid once it is listed in base station authentication unit 113. Although shown herein as a single unit, in practice base station authentication unit 113 may be made up of several parts, which need not be geographically collocated. Furthermore, to improve reliability and performance, some or all of the various parts or functions of base station authentication unit 113 may be replicated, as will be readily recognized by those of ordinary skill in the art.

Base station authentication unit 113 is connected to network 111 via communication link 117. Of course, when base station authentication unit 113 is made up of more than one part, or is replicated, communication link 117 is construed as covering all the necessary communications paths between network 111 and the various parts or replicas.

Security center 119 contains a list of all valid wireless terminals that may be served. In addition, security center 119 contains security information, such as authentication challenge-response pairs and/or encryption keys associated with each wireless terminal. The security information may be distributed by security center 119 to base stations 103, as necessary. A wireless terminal may be listed in security center 119 at any point. However, the wireless terminal only becomes valid once it is listed in security center 119. Although shown herein as a single unit, in practice security center 119 may be made up of several parts, which need not be geographically collocated. Furthermore, to improve reliability and performance, some or all of the various parts or functions of security center 119 may be replicated, as will be readily recognized by those of ordinary skill in the art.

Security center 119 is connected to network 111 via communication link 121. Of course, when security center 119 is made up of more than one part, or is replicated, communication link 121 is construed as covering all the necessary communications paths between network 111 and the various parts or replicas.

The cost of wireless systems can be reduced significantly, and their performance increased, through the use of dynamic, wireless-terminal-based paging area assignment, in accordance with the principles of the invention. Although it is possible to use the instant invention when the network architecture is known, to further reduce costs, preferably use is made of a wireless terminal controlled handoff process by which at least portions of the "map", i.e., the pattern of neighboring base stations, for use as a paging area, is discovered and updated. One such self discovering network arrangement is disclosed in our copending United States Patent Application Serial No. (case Davies-Vanderveen 1-5), which is incorporated by reference as if set forth entirely herein. In such an arrangement, it takes at least one handoff for each such base station neighbor to discover this "map". Once the map of the network architecture is known, paging areas aligned with the wireless terminal's initial base station may be dynamically created, in accordance with an aspect of the invention. To this end, the network of FIG. 1 operates generally as follows.

As part of the handoff process, the wireless terminal tells the new base station to which it is handing off the call the identity of the previous base station from which control is being handed off. If the new base station does not have a valid record for the previous base station, it forms a trust relationship with the previous base station and creates a record for it, thus identifying it as an immediate neighbors Additionally, both base stations exchange lists of other base stations known to them, preferably with the constraint that these other base stations must be within a prescribed number of handoffs less one of the base station supplying the list. For example, a distance of two handoffs means that in travelling from base station A to base station C, a wireless terminal would hand off from A to B and then from B to C, thus performing a total of two handoffs. Thus the base station receiving the list will know of all the base stations within the prescribed number of handoffs of the receiving base station of which the base station supplying the list is aware.

Figure 2:
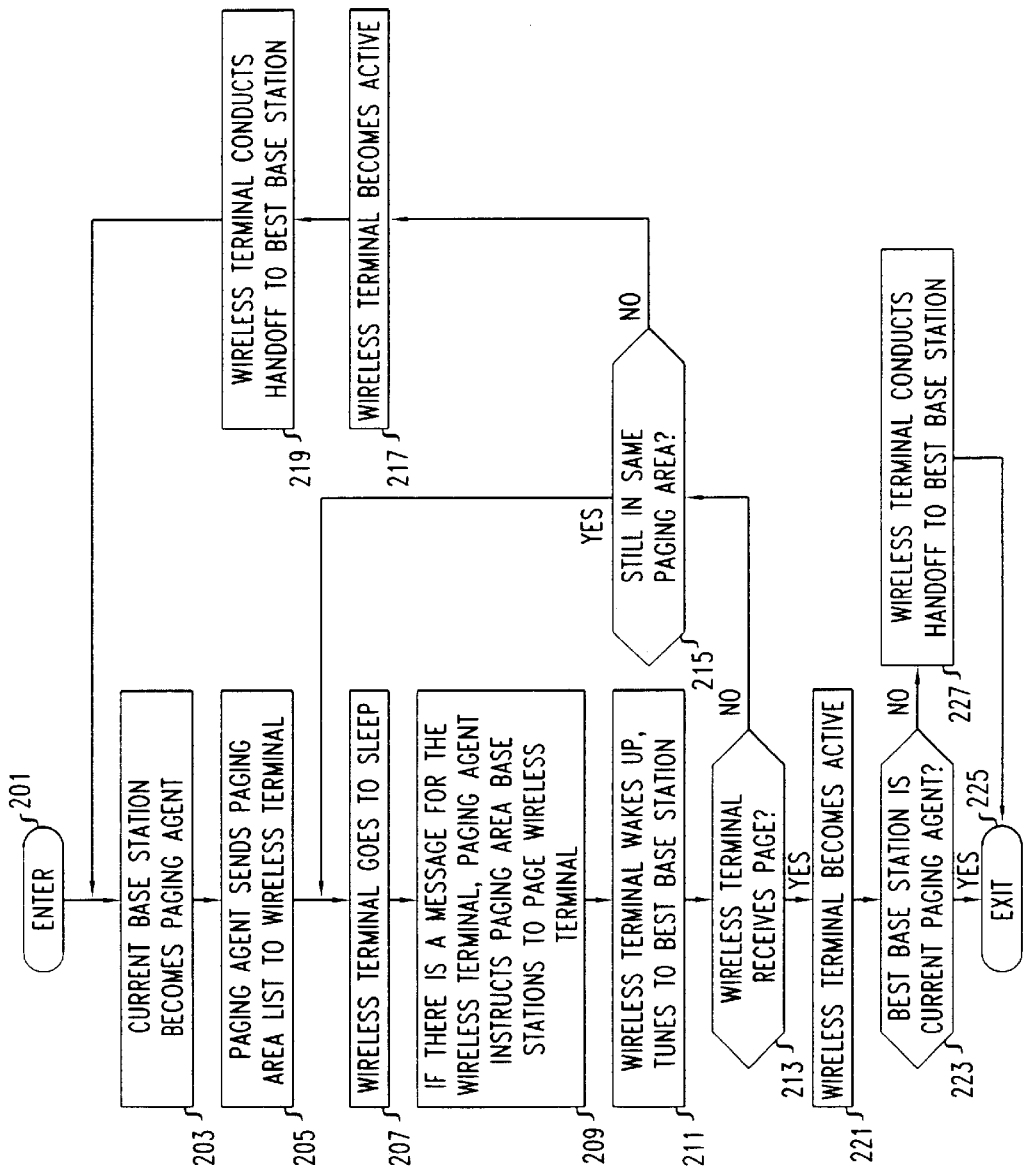
FIG. 2 shows an exemplary process, in flow chart form, for defining and redefining a paging area, in accordance with the principles of the invention.

FIG. 2 shows an exemplary process, in flow chart form, for defining and redefining a paging area, in accordance with the principles of the invention. The process is entered in step 201 when a) the wireless terminal, e.g., wireless terminal 101, initially powers up; b) is in range of a base station, which is the current base station, e.g., base station 103-1; and c) enters paging mode because it has no user information to communicate in active mode. If the wireless terminal is in range of more than one base station, the one having the best signal for communicating becomes the current base station. In step 203, the current base station, e.g., base station 103-1, becomes the paging agent for the wireless terminal, in accordance with the principles of the invention. Next, in step 205, the paging agent sends a paging area list to the wireless terminal. As noted, the paging area list is a list of all the base stations that are known to the current base station and are within a prescribed number of handoffs of the first base station. The wireless terminal enters sleep mode in step 207.

At any time after the wireless terminal went to sleep it is possible that a message arrives at the paging agent for the wireless terminal. If so, in step 209, the paging agent instructs the paging area base stations, in which it is included as well, to transmit pages for the wireless terminal. The pages are transmitted repeatedly by each base station in the paging area for a specified time, which is at the discretion of the implementor.

After a period of time, which 1) may be unique to the particular wireless terminal, 2) may be a function of the system, or 3) may be prescribed directly by the implementor, the wireless terminal "wakes up", in step 211, for the purpose of determining a) its current location, as it may have been moving while it was sleeping, and b) if there is a page for it. To this end, the wireless terminal tunes to the base station having the best signal for communicating.

In conditional branch point 213 the wireless terminal tests to determine if it is receiving a page from the base station to which it tuned when it woke up. If the test result in step 213 is NO, indicating that no page is being received from the base station to which the wireless terminal tuned when it woke up, control passes to step 215, in which the wireless terminal tests to determine if it is still with the paging area that was assigned for it in step 205, i.e., before the wireless terminal went to sleep. This is performed by checking the identity of the base station to which the wireless terminal tuned when it woke up against the paging area list that the wireless terminal received in step 205. If the test result in step 215 is YES, indicating that the wireless terminal is still in the same paging area, no action needs to be taken at this time. Therefore, control passes back to step 207 and the process continues as described above.

If the test result in step 215 is NO, indicating that the wireless terminal has moved outside of the paging area to which it was previously assigned, control passes to step 217 in which the wireless terminal enters the active mode, i.e., it establishes a wireless link for two-way communication with the base station, e.g., base station 103-2, to which the wireless terminal tuned when it woke up. This entry into active mode is for the limited purpose of conducting a handoff to the base station to which the wireless terminal tuned when it woke up, which is performed in step 219. For example, the handoff may be of the type performed in the well known protocol Mobile-Internet Protocol (IP).

The base station to which the wireless terminal tuned when it woke up now becomes the current base station for the wireless terminal. As a result, when the process continues at step 203 the new current base station will become the new paging agent for the wireless terminal, in accordance with the principles of the invention.

Note that if a message exists for the wireless terminal, then the wireless terminal could become active immediately and proceed directly to exit at step 225 to receive the message. Optionally, the prior paging agent may be notified of the handoff and the change of paging agent, i.e., its decommissioning from being the paging agent for the wireless terminal.

If the test result in step 213 is YES, because the wireless terminal received a page, this indicates that the wireless terminal is still within the paging area. Therefore, control passes to step 221, in which the wireless terminal enters the active mode, i.e., it establishes a wireless link for two-way communication with the base station to which the wireless terminal tuned when it woke up. Thereafter, conditional branch point 223 tests to determine if the base station to which the wireless terminal tuned when it woke up is the current paging agent. If the test result in step 223 is YES, there is no need for further action and the process exits in step 225, because the wireless terminal will now engage in communication required in response to the page.

If the test result in step 223 is NO, control passes to step 227, in which the wireless terminal conducts a handoff to the base station to which the wireless terminal tuned when it woke up. The base station to which the wireless terminal tuned when it woke up now becomes the current base station for the wireless terminal. The process then exits in step 225, because the wireless terminal will now engage in communication required in response to the page.

What is claimed is:

1. A method for developing a paging area for a wireless base station, comprising the steps of:

receiving, in said base station, information from at least one wireless terminal regarding at least one base station that is a neighbor to said base station;

receiving, in said base station, information from said at least one other wireless base station information indicating base stations that are neighbors to said other base station; and determining which base stations are within a prescribed number of handoffs from said base station, as a function of said information received from said at least one wireless terminal and from said at least one other wireless base station.

2. The invention as defined in claim 1 further comprising the step of transmitting an indication of said determined base stations that are within a prescribed number of handoffs from said base station to a wireless terminal for use as a paging area.

3. The invention as defined in claim 1 further comprising the step of transmitting from said base station an indication of said determined base stations that are within a prescribed number of handoffs from said base station to a wireless terminal for use as a paging area.

4. The invention as defined in claim 1 further comprising the step of transmitting a list of said determined base stations to a wireless terminal for use as a paging area.

5. A method for use in connection with a wireless terminal in a wireless network having a plurality of wireless base stations, the method comprising the steps of:

receiving an indication of a first paging area from a first base station when said wireless terminal is served by a first base station as paging agent;

receiving an indication of a second paging area when said wireless terminal is later served by a second base station as paging agent; and receiving an indication of a third paging area from said first base station when said wireless terminal is yet later served by said first base station as paging agent;

wherein said first and third paging areas are different because there is a different number of base stations that are within a prescribed number of handoffs from said first base station at the time of said assigning of said first paging area than there is at said time of assigning said third paging area.

6. A method for use in connection with a wireless terminal in a wireless network having a plurality of wireless base stations, the method comprising the steps of:

receiving an indication of a first paging area from a first base station when said wireless terminal is served by a first base station as paging agent;

receiving an indication of a second paging area when said wireless terminal is later served by a second base station as paging agent; and receiving an indication of a third paging area from said first base station when said wireless terminal is yet later served by said first base station as paging agent;

wherein said first and third paging areas are different because said first base station was relocated between the time of said assigning of said first paging area and the time of assigning said third paging area.

7. The invention as defined in claim 5 wherein said wireless terminal was in sleep mode for at least a portion of time between the time of said assigning of said first paging area and the time of assigning said second paging area.

8. The invention as defined in claim 5 wherein said wireless terminal was in sleep mode for at least a portion of time between the time of said assigning of said second paging area and the time of assigning said third paging area.

9. The invention as defined in claim 6 wherein said wireless terminal was in sleep mode for at least a portion of time between the time of said assigning of said first paging area and the time of assigning said second paging area.

10. The invention as defined in claim 6 wherein said wireless terminal was in sleep mode for at least a portion of time between the time of said assigning of said second paging area and the time of assigning said third paging area.

* * * * *